(12) United States Patent
Yoshioka

(10) Patent No.: US 8,763,379 B2
(45) Date of Patent: Jul. 1, 2014

(54) ELECTRICALLY HEATED CATALYST

(75) Inventor: Mamoru Yoshioka, Susono (JP)

(73) Assignee: Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/381,771

(22) PCT Filed: Mar. 9, 2011

(86) PCT No.: PCT/JP2011/055542
§ 371 (c)(1),
(2), (4) Date: Dec. 30, 2011

(87) PCT Pub. No.: WO2012/120669
PCT Pub. Date: Sep. 13, 2012

(65) Prior Publication Data
US 2014/0033688 A1      Feb. 6, 2014

(51) Int. Cl.
*F01N 3/10*          (2006.01)
(52) U.S. Cl.
USPC ............................................................. 60/300
(58) Field of Classification Search
USPC ............................ 60/300; 422/174, 179, 180
See application file for complete search history.

(56) References Cited

U.S. PATENT DOCUMENTS

| | | | | |
|---|---|---|---|---|
| 5,070,694 A | * | 12/1991 | Whittenberger | ................ 60/300 |
| 5,272,876 A | | 12/1993 | Sheller | |
| 5,846,495 A | * | 12/1998 | Whittenberger et al. | ...... 422/180 |
| 5,851,496 A | * | 12/1998 | Sakurai | .......................... 422/174 |
| 5,866,077 A | * | 2/1999 | Sakurai et al. | ................. 422/174 |

FOREIGN PATENT DOCUMENTS

| | | | |
|---|---|---|---|
| GB | 2425073 A | * | 10/2006 |
| JP | 5-269387 A | | 10/1993 |
| JP | 6-55080 A | | 3/1994 |
| JP | 8-193513 A | | 7/1996 |
| JP | 8-266909 A | | 10/1996 |

* cited by examiner

*Primary Examiner* — Thomas Denion
*Assistant Examiner* — Jason Shanske
(74) *Attorney, Agent, or Firm* — Sughrue Mion, PLLC

(57) ABSTRACT

The present invention is intended to suppress a short circuit between a heat generation element and a case in an electrically heated catalyst. An electrically heated catalyst (1) according to the present invention is provided with a heat generation element (3), a case (4), an insulating support member (5) arranged between said heat generation element (3) and said case (4), an inner pipe (6) inserted into said insulating support member (5) with its ends protruding into an exhaust gas from end faces of said insulating support member (5), and a catalyst (10) having an oxidation function that covers at least outer peripheral surfaces of protrusion portions (6a, 6b) of said inner pipe (6) protruding into the exhaust gas from the end faces of said insulating support member (5), except for predetermined ranges which are in contact with the end faces of said insulating support member (5).

3 Claims, 4 Drawing Sheets

ELECTRICALLY HEATED CATALYST

TECHNICAL FIELD

The present invention relates to an electrically heated catalyst that is arranged in an exhaust passage of an internal combustion engine.

BACKGROUND ART

In the past, as an exhaust gas purification catalyst arranged in an exhaust passage of an internal combustion engine, there has been developed an electrically heated catalyst (Electric Heating Catalyst: hereinafter referred to as an EHC) in which a catalyst is heated by means of a heat generation element which generates heat by electrical energization thereof.

In the EHC, an insulating support member which serves to support the heat generation element and to insulate electricity is arranged between the heat generation element which generates heat by electrical energization thereof, and a case in which the heat generation element is received. For example, in Patent Document 1, there is disclosed a technique in which in an EHC, a mat of an insulating material is arranged between a carrier which is electrically energized to generate heat and a case in which the carrier is received.

PRIOR ART DOCUMENTS

Patent Documents

Patent Document 1: Japanese patent application laid-open No. H05-269387

SUMMARY OF THE INVENTION

Problem to be Solved by the Invention

In the EHC, there may be provided an inner pipe in order to suppress a short circuit between the heat generation element and the case due to the condensed water which has permeated (infiltrated) into the insulating support member. The inner pipe is a tubular member which is sandwiched or clamped by the insulating support member in such a manner as to position between the heat generation element and the case. In addition, the inner pipe has an electrically insulating layer formed on the entire surface thereof, or the inner pipe is formed of an electrically insulating material.

In cases where the EHC is provided with the inner pipe, the inner pipe is formed in a manner so as to protrude from an end face of the insulating support member into an exhaust gas. By forming the inner pipe in such a manner, the inner pipe serves to suppress the condensed water, which has flowed on an inner wall surface of the case and reached the insulating support member, from reaching up to the heat generation element while transmitting through the end face of the insulating support member. Accordingly, it is possible to suppress the short circuit between the heat generation element and the case through the condensed water not only in the interior of the insulating support member but also on the end face of the insulating support member.

However, when the inner pipe is constructed in the above-mentioned manner, a particle-like material (Particulate Matter: hereinafter also referred to as PM) in the exhaust gas will adhere to a protrusion portion in the inner pipe which protrudes from the end face of the insulating support member. As a result, when the PM deposits on the protrusion portion of the inner pipe, there is a fear that the heat generation element and the case may be short-circuited with each other by the PM (particulate matter) thus deposited.

The present invention has been made in view of the problems as referred to above, and has for its object to suppress a short circuit between a heat generation element and a case in an electrically heated catalyst.

Means for Solving the Problem

The present invention resides in that in an EHC, at least an outer peripheral surface of a protrusion portion of an inner pipe protruding into an exhaust gas from an end face of an insulating support member, except for a predetermined range which is in contact with the end face of the insulating support member, is covered with a catalyst having an oxidation function.

More specifically, an electrically heated catalyst (EHC) according to the present invention is provided with:

a heat generation element that is electrically energized to generate heat so that a catalyst is heated by the generation of heat;

a case that receives said heat generation element therein;

an insulating support member that is arranged between said heat generation element and said case for supporting said heat generation element and insulating electricity;

an inner pipe that is a tubular member which is inserted into said insulating support member so as to be located between said heat generation element and said case, wherein said inner pipe has an end thereof protruding into an exhaust gas from an end face of said insulating support member, and said inner pipe has an electrically insulating layer formed on an entire surface thereof, or said inner pipe is formed of an electrically insulating material; and a catalyst having an oxidation function that covers at least an outer peripheral surface of a protrusion portion of said inner pipe protruding into the exhaust gas from the end face of said insulating support member, except for a predetermined range which is in contact with the end face of said insulating support member.

By covering the protrusion portion of the inner pipe with the catalyst having an oxidation function, it is possible to facilitate the oxidation of particulate matter adhered to the protrusion portion. For that reason, it is possible to suppress the deposition of particulate matter in that portion of the protrusion portion which is covered with the catalyst. As a result, it is possible to suppress a short circuit between the heat generation element and the case due to the particulate matter.

However, in cases where the protrusion portion of the inner pipe is covered with the catalyst, the portion which is covered with the catalyst is made porous, and hence, it becomes easy for condensed water to stay in that portion. Accordingly, when the whole of the protrusion portion of the inner pipe is covered with the catalyst, a short circuit between the heat generation element and the case can be easily caused due to the condensed water which has stayed in that portion.

Here, the flow rate of the exhaust gas is smaller on an outer side of the inner pipe than on an inner side thereof. For that reason, it is more difficult for particulate matter to deposit on the outer peripheral surface of the protrusion portion of the inner pipe in comparison with the inner peripheral surface of the protrusion portion. In addition, in the protrusion portion of the inner pipe, it is more difficult for particulate matter to deposit in a portion thereof which is close to the end face of the insulating support member in comparison with a portion thereof which is distant or remote from the end face of the insulating support member. For that reason, in the protrusion portion of the inner pipe, it is the most difficult for particulate matter to deposit in that portion of the outer peripheral surface which is close to the end face of the insulating support member.

Accordingly, in the present invention, the outer peripheral surface of the protrusion portion of the inner pipe, except for the predetermined range which is in contact with the end face of the insulating support member, is covered with the catalyst having an oxidation function. That is, the catalyst is not formed on that portion of the protrusion portion of the inner pipe on which it is the most difficult for particulate matter to deposit. It is difficult for the condensed water to stay in the portion on which the catalyst is not formed.

Consequently, according to the present invention, it is possible to suppress all short circuits between the heat generation element and the case resulting from the particulate matter as well as resulting from the condensed water, in the EHC.

In the present invention, in cases where the inner pipe protrudes into the exhaust gas from both upstream side and downstream side end faces of the insulating support member, an amount of the catalyst which covers a downstream side protrusion portion of the inner pipe may be smaller in comparison with an amount of the catalyst which covers an upstream side protrusion portion of the inner pipe. Moreover, in this case, only the upstream side protrusion portion of the inner pipe may be covered with the catalyst.

An amount of particulate matter in the exhaust gas which flows out of the EHC is smaller than an amount of particulate matter in the exhaust gas which flows into the EHC. As a result, the amount of particulate matter adhering to the downstream side protrusion portion of the inner pipe is smaller than the amount of particulate matter adhering to the upstream side protrusion portion of the inner pipe. In addition, the temperature of the exhaust gas which flows out of the EHC is higher than the temperature of the exhaust gas which flows into the EHC. For that reason, the temperature of the downstream side protrusion portion of the inner pipe is higher in comparison with the temperature of the upstream side protrusion portion of the inner pipe. Accordingly, in the downstream side protrusion portion of the inner pipe, it is possible to oxidize the particulate matter to a sufficient extent even if the amount of catalyst thereon is made smaller than that on the upstream side protrusion portion of the inner pipe, or even if the catalyst is not formed thereon.

Consequently, according to the above, it is possible to suppress a short circuit between the heat generation element and the case, while suppressing the amount of the catalyst to be used.

As described above, it is more difficult for particulate matter to adhere to an outer peripheral surface of a protrusion portion of the inner pipe in comparison with an inner peripheral surface of the protrusion portion. Then, if the deposition of particulate matter on the outer peripheral surface of the protrusion portion can be suppressed, it is possible to suppress a short circuit between the heat generation element and the case due to the particulate matter. Accordingly, only the outer peripheral surface of the protrusion portion of the inner pipe except for a predetermined range which is in contact with one end face of the insulating support member, may be covered with the catalyst. That is, the catalyst may not be provided on the inner peripheral surface of the protrusion portion of the inner pipe.

BRIEF DESCRIPTION OF THE DRAWINGS

According to the present invention, it is possible to suppress a short circuit between the heat generation element and the case in the EHC.

BRIEF DESCRIPTION OF THE DRAWINGS

Figure 1:
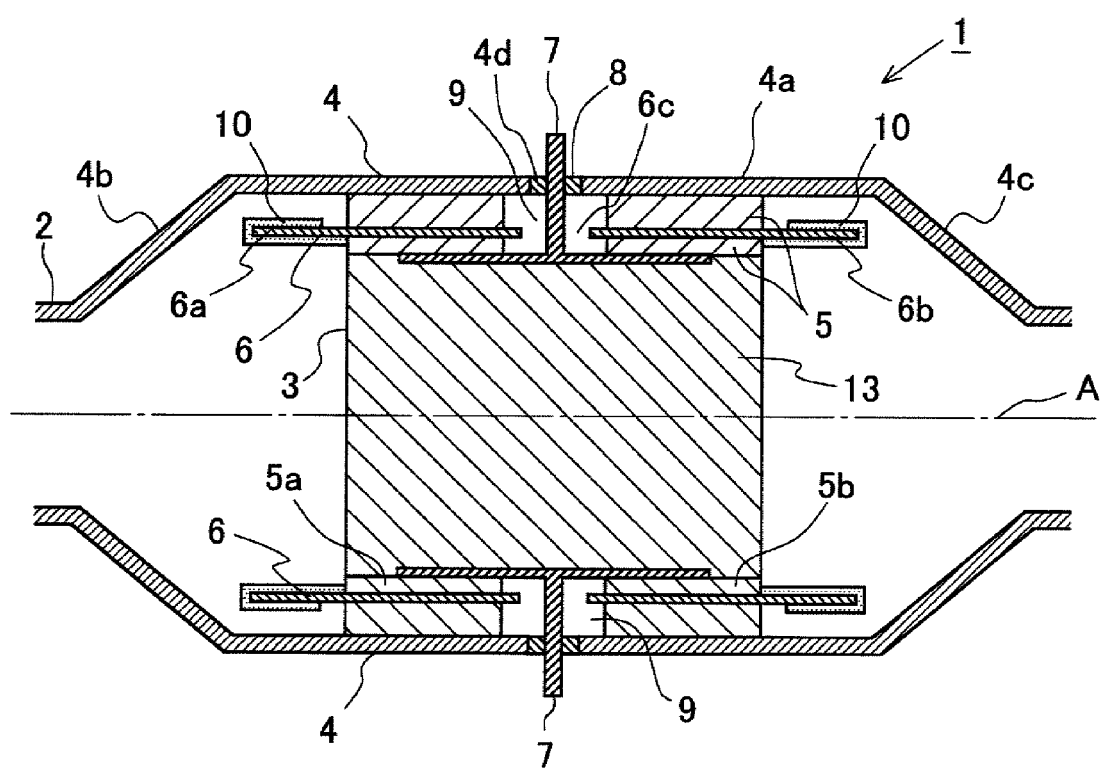

FIG. 1 is a view showing the schematic construction of an electrically heated catalyst according to a first embodiment of the present invention.

Figure 2:
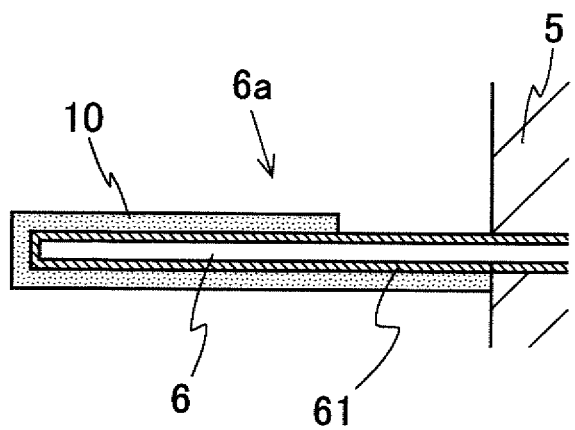

FIG. 2 is an enlarged view of a protrusion portion of an inner pipe in the electrically heated catalyst according to the first embodiment of the present invention.

Figure 3:
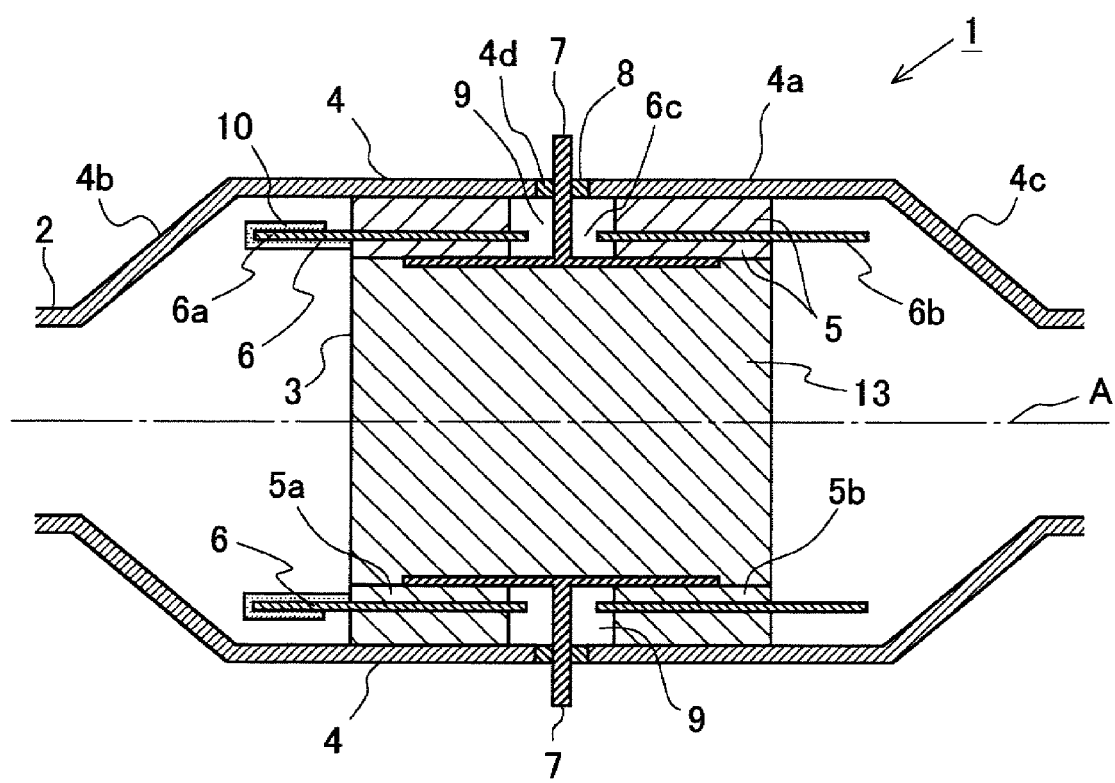

FIG. 3 is a view showing the schematic construction of an electrically heated catalyst according to a second embodiment of the present invention.

Figure 4:
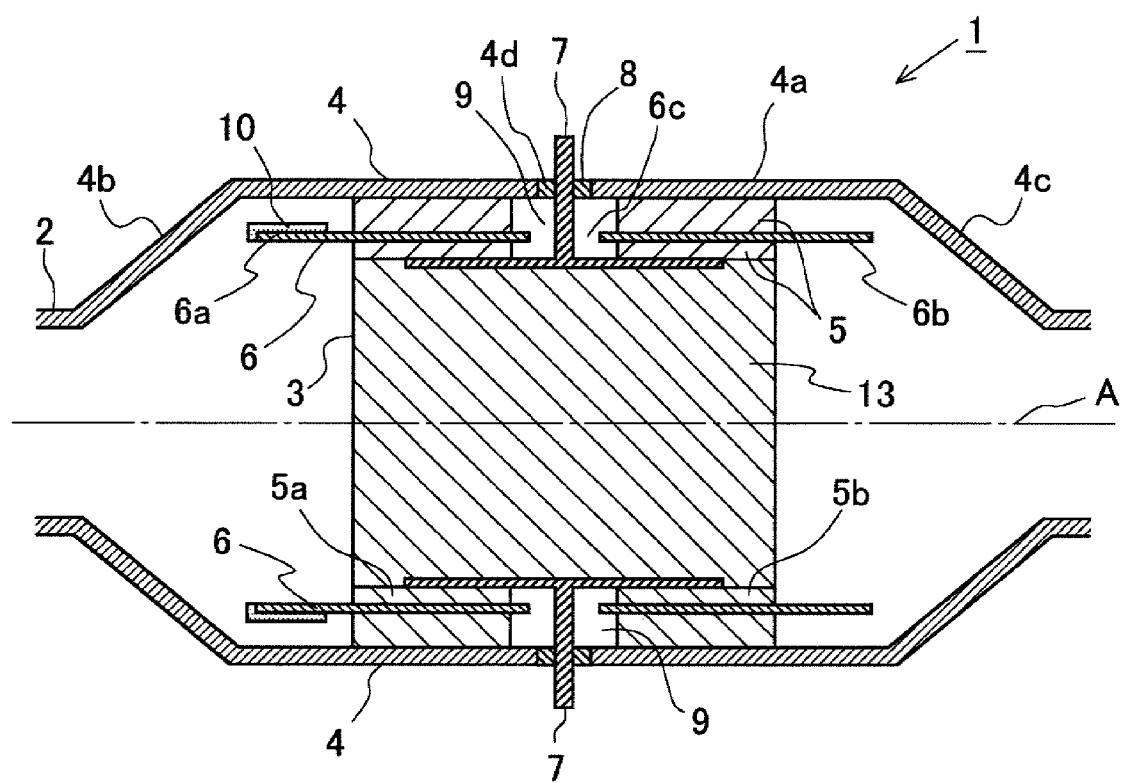

FIG. 4 is a view showing the schematic construction of an electrically heated catalyst according to a modified form of the second embodiment of the present invention.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Schematic Construction of an EHC

FIGS. 1 and 2 are views showing the schematic construction of an electrically heated catalyst (EHC) according to this first embodiment of the present invention. FIG. 1 is a cross sectional view showing the EHC cut along a central axis thereof. FIG. 2 is an enlarged view of a protrusion portion in an inner pipe protruded into an exhaust gas from an end face of a catalyst carrier, which will be described later.

The EHC 1 according to this embodiment is arranged in an exhaust pipe of an internal combustion engine mounted on a vehicle. The internal combustion engine may be a diesel engine, or may be a gasoline engine. In addition, the EHC 1 according to this embodiment can also be used in a vehicle which adopts a hybrid system equipped with an electric motor.

The EHC 1 according to this embodiment is provided with a catalyst carrier 3, a case 4, a mat 5, an inner pipe 6, and electrodes 7. The catalyst carrier 3 is formed in the shape of a circular cylinder, and is arranged in such a manner that a central axis thereof is in alignment with the central axis A of the exhaust pipe 2. An exhaust gas purification catalyst 13 is carried or supported by the catalyst carrier 3. As the exhaust gas purification catalyst 13, there can be exemplified an oxidation catalyst, an NOx storage reduction catalyst, an NOx selective reduction catalyst, a three-way catalyst, and so on.

The catalyst carrier 3 is formed of a material which, when electrically energized, becomes an electric resistance to generate heat. As a material for the catalyst carrier 3, there can be exemplified SiC. The catalyst carrier 3 has a plurality of passages which extend in a direction in which an exhaust gas flows (i.e., the direction of the central axis A), and which have a cross section of honeycomb shape vertical to the direction in which the exhaust gas flows. The exhaust gas flows through these passages. Here, note that the cross sectional shape of the catalyst carrier 3 in the direction orthogonal to the central axis A may be elliptical, etc. The central axis A is a central axis common to the exhaust pipe 2, the catalyst carrier 3, the inner pipe 6, and the case 4.

The catalyst carrier 3 is received in the case 4. An electrode chamber 9 is formed in the case 4. Here, note that the details of the electrode chamber 9 will be described later. One pair of electrodes 7 are connected to the catalyst carrier through the electrode chamber 9 in a left and right (horizontal) direction. Electricity is supplied to the electrodes 7 from a battery (not shown). When electricity is supplied to the electrodes 7, the catalyst carrier 3 is electrically energized. When the catalyst carrier 3 generates heat by energization thereof, the exhaust gas purification catalyst 13 supported by the catalyst carrier 3 is heated, so that the activation thereof is facilitated.

The case 4 is formed of metal. As a material which forms the case 4, there can be exemplified a stainless steel material. The case 4 has a receiving portion 4a which is constructed to include a curved surface parallel to the central axis A, and tapered portions 4b, 4c which serve to connect the receiving portion 4a and the exhaust pipe 2 with each other at the upstream side and the downstream side, respectively, of the receiving portion 4a. The receiving portion 4a has a channel cross section which is larger than that of the exhaust pipe 2, and the catalyst carrier 3, the mat 5, and the inner pipe 6 are received in the inside of the receiving portion 4a. The tapered portions 4b, 4c each take a tapered shape of which the channel cross section decreases in accordance with the increasing distance thereof from the receiving portion 4a.

The mat 5 is inserted between an inner wall surface of the receiving portion 4a of the case 4, and an outer peripheral surface of the catalyst carrier 3. In other words, inside the case 4, the catalyst carrier 3 is supported by the mat 5. In addition, the inner pipe 6 is inserted in the mat 5. The inner pipe 6 is a tubular shape with the central axis A being located as a center thereof. The mat 5 is arranged to sandwich or clamp the inner pipe 6 therein, whereby it is divided into a portion at the side of the case 4 and a portion at the side of the catalyst carrier 3 by means of the inner pipe 6.

The mat 5 is formed of an electric insulation material. As a material which forms the mat 5, there can be exemplified a ceramic fiber which includes alumina as a main component. The mat 5 is wound around the outer peripheral surface of the catalyst carrier 3 and the outer peripheral surface of the inner pipe 6. In addition, the mat 5 is divided into an upstream side portion 5a and a downstream side portion 5b, and a space is formed between the upstream side portion 5a and the downstream side portion 5b. Due to the insertion of the mat 5 between the catalyst carrier 3 and the case 4, it is possible to suppress electricity from flowing into the case 4 at the time when the catalyst carrier 3 is electrically energized.

The inner pipe 6 is formed of a stainless steel material. In addition, an electrically insulating layer 61 is formed on the entire surface of the inner pipe 6, as shown in FIG. 2. Ceramic or glass can be exemplified as a material which forms the electrically insulating layer 61. Here, note that the main body of the inner pipe 6 may be formed of an electrically insulating material such as alumina or the like.

In addition, as shown in FIG. 1, the inner pipe 6 has a length in the direction of the central axis A longer than that of the mat 5. As a result, the inner pipe 6 has an upstream side end and a downstream side end thereof protruding from an upstream side end face and a downstream side end face of the mat 5, respectively. In the following, those portions 6a, 6b of the inner pipe 6 which protrude from the end faces of the mat 5 into the exhaust gas are referred to as "protrusion portions".

The case 4 and the inner pipe 6 have through holes 4d, 6c opened therein, respectively, so as to allow the electrodes 7 to pass through them. Then, the electrode chamber 9 is formed by a space between the upstream side portion 5a and the downstream side portion 5b of the mat 5 in the case 4. In other words, in this embodiment, the electrode chamber 9 is formed over the entire circumference of the outer peripheral surface of the catalyst carrier 3 between the upstream side portion 5a and the downstream side portion 5b of the mat 5. Here, note that a space. which is used as the electrode chamber, may be formed by forming through holes only in those portions of the mat 5 through which the electrodes 7 pass, without dividing the mat 5 into the upstream side portion 5a and the downstream side portion 5b.

Electrode support members 8, which serve to support the electrodes 7, respectively, are arranged in the through holes 4d which are opened in the case 4. These electrode support members 8 are each formed of an electrically insulating material, and are fitted with no gap between the case 4 and the the electrodes 7.

The protrusion portions 6a, 6b of the inner pipe 6 are covered with oxidation catalysts 10, respectively. The oxidation catalysts 10 further cover the electrically insulating layer 61 which covers the surface of the inner pipe 6. In addition, the oxidation catalysts 10 do not cover the entire surfaces of the protrusion portions 6a, 6b of the inner pipe 6. That is, portions of the outer peripheral surfaces of the protrusion portions 6a, 6b of the inner pipe 6 except for predetermined ranges which are in contact with the end faces of the mat 5, respectively, are covered with the oxidation catalysts 10, respectively.

Here, note that in this embodiment, the catalyst carrier 3 corresponds to a heat generation element according to the present invention. However, the heat generation element according to the present invention is not limited to a carrier which supports a catalyst, but instead the heat generation element may be a structure which is arranged at the upstream side of a catalyst, for example. In addition, in this embodiment, the case 4 corresponds to a case according to the present invention, the mat 5 corresponds to an insulating support member according to the present invention, and the inner pipe 6 corresponds to an inner pipe according to the present invention. Also, in this embodiment, the oxidation catalysts 10 correspond to a catalyst having an oxidation function according to the present invention. However, the catalyst having an oxidation function according to the present invention is not limited to an oxidation catalyst.

Operational Effects of the Construction of the EHC According to this Embodiment

In the exhaust pipe 2 or in the case 4 of the EHC 1, condensed water is generated due to condensation of the moisture in the exhaust gas at the time of cold start of the internal combustion engine or the like. When the condensed water generated in the exhaust pipe 2 or in the case 4 flows along the inner wall surface of the case 4 and reaches up to the mat 5, the condensed water may permeate (infiltrate) into the mat 5. Also, the moisture, which has permeated into the mat 5 in the state of water vapor, may condense inside the mat 5.

Accordingly, in the EHC 1 according to this embodiment, the inner pipe 6, of which the entire surface is covered with the electrically insulating layer 61, is inserted into the mat 5. Due to such an arrangement, it is possible to suppress the catalyst carrier 3 and the case 4 from being short-circuited to each other by means of the condensed water inside the mat 5. In addition, by means of the protrusion portions 6a, 6b of the inner pipe 6, it is possible to suppress the condensed water from reaching up to the catalyst carrier 3 while transmitting through the end faces of the mat 5. Accordingly, it is possible to suppress the short circuit between the catalyst carrier 3 and the case 4 through the condensed water on the end faces of the mat 5.

Here, note that in this embodiment, the inner pipe 6 need not necessarily protrude from both the upstream side and the downstream side of the mat 5. For example, the construction may also be such that a protrusion portion of the inner pipe 6 is formed only at the upstream side of the mat at which an amount of generation of condensed water is more than that at the downstream side thereof.

However, when the inner pipe 6 is constructed as mentioned above, PM (particulate matter) in the exhaust gas will adhere to the protrusion portions 6a, 6b of the inner pipe 6. The particulate matter has electric conductivity. As a result, when the particulate matter deposits over the end faces of the mat 5, and the entire surface of the protrusion portion 6a (or 6b) of the inner pipe 6, there occurs a short circuit between the catalyst carrier 3 and the case 4 through the particulate matter thus deposited.

Accordingly, in this embodiment, the oxidation catalysts 10 are formed on the surfaces of the protrusion portions 6a, 6b of the inner pipe 6. The oxidation of the particulate matter adhered to the protrusion portions 6a, 6b is facilitated by the oxidation catalysts 10. According to this, it is possible to suppress a short circuit between the catalyst carrier 3 and the case 4 through the particulate matter.

However, when the protrusion portions 6a, 6b of the inner pipe 6 are covered with the oxidation catalysts 10, those portions which are covered with the oxidation catalysts 10 are made porous. For that reason, it becomes easy for condensed water to stay in these portions. Accordingly, when the whole of the protrusion portions 6a, 6b of the inner pipe 6 is covered with the oxidation catalysts 10, it becomes easy for the catalyst carrier 3 and the case 4 to be short-circuited with each other through the condensed water which has stayed in the above portions.

Accordingly, in the EHC 1 according to this embodiment, the portions of the outer peripheral surfaces of the protrusion portions 6a, 6b of the inner pipe 6 except for the predetermined ranges which are in contact with the end faces of the mat 5, respectively, are covered with the oxidation catalysts 10, respectively. That is, the oxidation catalysts 10 are not formed in those predetermined ranges in the outer peripheral surfaces of the protrusion portions 6a, 6b of the inner pipe 6 which are in contact with the end faces of the mat 5, respectively. In the portions of the predetermined ranges, the electrically insulating layer 61 is exposed to the exhaust gas. The electrically insulating layer 61 has a water repellent effect. For that reason, condensed water is difficult to stay in the portions of the predetermined ranges.

In addition, the flow rate of the exhaust gas is smaller on the outer side of the inner pipe 6 than on the inner side thereof. For that reason, it is more difficult for particulate matter to deposit on the outer peripheral surfaces of the protrusion portions 6a, 6b of the inner pipe 6 in comparison with the inner peripheral surfaces of the protrusion portions 6a, 6b. In addition, in the protrusion portions 6a, 6b of the inner pipe 6, it is more difficult for particulate matter to deposit in portions thereof which are close to the end faces of the mat 5, respectively, in comparison with portions thereof which are distant or remote from the end faces of the mat 5, respectively. For that reason, in the protrusion portions 6a, 6b of the inner pipe 6, it is the most difficult for particulate matter to deposit in those portions of the outer peripheral surfaces thereof which are close to the end faces of the mat 5, respectively. That is, in the above-mentioned predetermined ranges in the outer peripheral surfaces of the protrusion portions 6a, 6b of the inner pipe 6, it is difficult for particulate matter to deposit, even if the oxidation catalysts 10 are not formed.

Accordingly, by forming the oxidation catalysts 10 on the protrusion portions 6a, 6b of the inner pipe 6, respectively, as mentioned above, it is possible to suppress all short circuits between the catalyst carrier 3 and the case 4 resulting from particulate matter as well as resulting from condensed water.

Second Embodiment

Schematic Construction of an EHC

FIG. 3 is a view showing the schematic construction of an electrically heated catalyst (EHC) according to this second embodiment of the present invention. FIG. 3 is a cross sectional view showing the EHC cut along a central axis thereof. In an EHC 1 according to this second embodiment, too, an inner pipe 6 has an upstream side end and a downstream side end thereof protruding from an upstream side end face and a downstream side end face of a mat 5, respectively. Then, in this embodiment, only an upstream side protrusion portion 6a of the inner pipe 6 is covered with an oxidation catalyst 10, and a downstream side protrusion portion 6b of the inner pipe 6 is not formed with an oxidation catalyst 10. The construction of the second embodiment other than this is the same as the construction of the EHC according to the first embodiment. Accordingly, in this embodiment, similar to the first embodiment, a portion of an outer peripheral surface of the upstream protrusion portion 6a of the inner pipe 6 except for a predetermined range which is in contact with one end face of the mat 5, is covered with the oxidation catalyst 10.

Operational Effects of the Construction of the EHC According to this Embodiment

The particulate matter in the exhaust gas which has flowed into the catalyst carrier 3 in the EHC 1 is trapped by means of the catalyst carrier 3. As a result, the amount of particulate matter in the exhaust gas which flows out of the EHC 1 is smaller than the amount of particulate matter in the exhaust gas which flows into the EHC 1. Accordingly, the amount of particulate matter adhering to the downstream side protrusion portion 6b of the inner pipe 6 is smaller than the amount of particulate matter adhering to the upstream side protrusion portion 6a of the inner pipe 6.

In addition, the exhaust gas which passes through the EHC 1 is heated by the heat generated by chemical reactions in the exhaust gas purification catalyst 13 supported on the catalyst carrier 3. As a result, the temperature of the exhaust gas which flows out of the EHC 1 becomes higher than the temperature of the exhaust gas which flows into the EHC 6. For that reason, the temperature of the downstream side protrusion portion 6b of the inner pipe 6 is high in comparison with the temperature of the upstream side protrusion portion 6a of the inner pipe 6. Also, in cases where the operating state of the internal combustion engine becomes a deceleration operation and fuel cut-off control is carried out, thus resulting in a drop in the temperature of the exhaust gas flowing into the EHC 1, it will be difficult for the temperature of the downstream side protrusion portion 6b of the inner pipe 6 to drop because the heat capacity of the catalyst carrier 3 is large.

From these reasons, in the downstream side protrusion portion 6b of the inner pipe 6, the amount of deposition of particulate matter is small and the oxidation of particulate matter is able to be facilitated in an easy manner, in comparison with the upstream side protrusion portion 6a of the inner pipe 6. For that reason, in the downstream side protrusion portion 6b of the inner pipe 6, it is possible to oxidize the particulate matter to a sufficient extent even if an oxidation catalyst 10 is not formed thereon. That is, it is possible to suppress the deposition of particulate matter to such an extent that the catalyst carrier 3 and the case 4 will be short-circuited with each other through the particulate matter.

Accordingly, in this embodiment, only the upstream side protrusion portion 6a of the inner pipe 6 is covered with the oxidation catalyst 10, and the downstream side protrusion portion 6b of the inner pipe 6 is not formed with the oxidation catalyst 10. According to this, it is possible to suppress a short circuit between the catalyst carrier 3 and the case 4, while suppressing or reducing an amount of the oxidation catalyst 10 to be used.

Modification

Here, note that in this embodiment, the amount of the oxidation catalyst 10 which covers the downstream side protrusion portion 6b of the inner pipe 6 may not necessarily be made zero, but may be made less than the amount of the oxidation catalyst 10 which covers the upstream side protrusion portion 6a of the inner pipe 6. In this case, too, the amount of the oxidation catalyst 10 to be used can be suppressed.

In addition, as stated above, particulate matter is more difficult to deposit on the outer peripheral surface of the upstream side protrusion portion 6a of the inner pipe 6 in comparison with the inner peripheral surface of the upstream side protrusion portion 6a. Then, if the deposition of particulate matter on the outer peripheral surface of the upstream side protrusion portion 6a can be suppressed, it is possible to suppress a short circuit between the catalyst carrier 3 and the case 4 due to the particulate matter in the upstream side of the EHC 1.

Accordingly, in this embodiment, as shown in FIG. 4, only the outer peripheral surface of the upstream side protrusion portion 6a of the inner pipe 6 except for the predetermined range which is in contact with the one end face of the mat 5, may be covered with the oxidation catalyst 10. That is, the oxidation catalyst 10 may not be provided on the inner peripheral surface of the upstream side protrusion portion 6a of the inner pipe 6. According to such a construction, the amount of the oxidation catalyst 10 to be used can be suppressed as much as possible.

DESCRIPTION OF THE REFERENCE SIGNS

1: electrically heated catalyst (EHC)
3: catalyst carrier
4: case
5: mat
6: inner pipe
6a, 6b: protrusion portions
7: electrodes
10: oxidation catalyst(s)

The invention claimed is:

1. An electrically heated catalyst by comprising:
a heat generation element that is electrically energized to generate heat so that a catalyst is heated by the generation of heat;
a case that receives said heat generation element therein;
an insulating support member that is arranged between said heat generation element and said case for supporting said heat generation element and insulating electricity;
an inner pipe that is a tubular member which is inserted into said insulating support member so as to be located between said heat generation element and said case, wherein said inner pipe has an end thereof protruding into an exhaust gas from an end face of said insulating support member, and said inner pipe has an electrically insulating layer formed on an entire surface thereof, or said inner pipe is formed of an electrically insulating material; and
a catalyst having an oxidation function that covers at least an outer peripheral surface of a protrusion portion of said inner pipe protruding into the exhaust gas from the end face of said insulating support member, except for a predetermined range which is in contact with the end face of said insulating support member.

2. The electrically heated catalyst as set forth in claim 1, wherein
said inner pipe protrudes into the exhaust gas from both upstream side and downstream side end faces of said insulating support member; and
an amount of said catalyst which covers a downstream side protrusion portion of said inner pipe is smaller in comparison with an amount of said catalyst which covers an upstream side protrusion portion of said inner pipe.

3. The electrically heated catalyst as set forth in claim 2, wherein
only the upstream side protrusion portion of said inner pipe is covered with said catalyst.

* * * * *